(12) United States Patent
Gill (10) Patent No.: US 7,746,602 B2
(45) Date of Patent: Jun. 29, 2010

(54) MAGNETIC READ HEAD WITH REDUCED SHUNTING

(75) Inventor: Hardayal S. Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 803 days.

(21) Appl. No.: 11/425,665

(22) Filed: Jun. 21, 2006

(65) Prior Publication Data

US 2007/0297090 A1 Dec. 27, 2007

(51) Int. Cl.
*G11B 5/39* (2006.01)

(52) U.S. Cl. .................. 360/324.12; 360/324.2

(58) Field of Classification Search .................. None
See application file for complete search history.

(56) References Cited

U.S. PATENT DOCUMENTS

| | | | |
|---|---|---|---|
| 2004/0061987 A1 * | 4/2004 | Mauri et al. | 360/324.12 |
| 2004/0090716 A1 | 5/2004 | Jayasekara | |
| 2004/0101978 A1 * | 5/2004 | Linn et al. | 438/3 |
| 2004/0137645 A1 | 7/2004 | Hu et al. | |
| 2004/0223267 A1 | 11/2004 | Childress et al. | |
| 2005/0064092 A1 | 3/2005 | Gill | |
| 2005/0277206 A1 | 12/2005 | Gaidis et al. | |
| 2006/0002042 A1 | 1/2006 | Gill | |

* cited by examiner

*Primary Examiner*—Craig A. Renner
*Assistant Examiner*—Tamara Ashford
(74) *Attorney, Agent, or Firm*—Patterson & Sheridan, L.L.P.

(57) ABSTRACT

A magnetic read head and a method for manufacturing a magnetic read head are provided. In one embodiment, the method includes providing the magnetic read head comprising a pinning layer disposed over a substrate of the magnetic read head, a pinned layer, a reference layer, a tunneling barrier layer, and a free layer, wherein the free layer is in contact with the tunneling barrier layer. The method further includes milling partially through the free layer from a back surface, thereby creating an exposed face of the free layer which is parallel to the substrate and oxidizing a portion of the free layer between the exposed face and the tunneling barrier layer. The method further includes milling through the free layer, tunneling barrier layer, reference layer, pinned layer, and pinning layer along lateral sides of the magnetic read head.

12 Claims, 9 Drawing Sheets

MAGNETIC READ HEAD WITH REDUCED SHUNTING

BACKGROUND OF THE INVENTION

1. Field of the Invention

Embodiments of the present invention generally relate to a magnetic read head with reduced shunting and a method for manufacturing a magnetic read head with reduced shunting.

2. Description of the Related Art

Modern computer systems typically include a hard drive which may be used as mass storage for the computer system. Information in the hard drive is typically stored as magnetic charge on one or more magnetic disks within the hard drive. To read the information, the hard drive includes a magnetic read head which senses the magnetic charge as the magnetic disks spin beneath the read head.

Modern magnetic read heads typically include several layers of material deposited on a substrate. As the magnetic head passes over an area of a magnetic disk in which a magnetic charge is present, the magnetic charge may induce a detectable change in the layers of material in the magnetic read head. For example, during a read operation, a current may be applied to the layers of material in the magnetic read head. The current applied to the layers of material may create a voltage across the layers of material which is proportional the resistance of the layers of material. As the head passes over a magnetic charge on the magnetic disk, the magnetic charge may cause a change in the combined resistance of the layers of material (e.g., an increase or decrease in the resistance of the layers of material). The stored magnetic charge may then be measured via a corresponding change in the voltage across the layers of material (e.g., a corresponding increase or decrease in the voltage resulting from the current applied to the layers of material).

In order to properly read the magnetic charge stored on the magnetic disk, the read head may be manufactured with a desired sensitivity. To achieve a desired sensitivity of the magnetic read head, several aspects of the magnetic read head may be modified during manufacturing of the read head. One example of changing an aspect of the magnetic read head during manufacturing is to vary the thickness of each of the layers, each of which may be extremely thin (e.g., tens of atoms thick). As another example of adjusting the sensitivity of the magnetic read head during manufacturing, after the layers of the magnetic read head have been deposited on the substrate, the layers of the magnetic read head may be milled along a side of the read head so that the area of one or more of the layers within the magnetic read head is changed to a desired value.

In some cases, due to the thinness of the layers of the magnetic read head, milling of the layers may result in material from one or more layers being spread across other layers of the magnetic read head (referred to as a shunt). The material spread during milling may create a direct electrical connection (e.g., a short) between one or more layers of the magnetic read head. As a result of the shunt, the sensitivity of the magnetic read head may be decreased. For example, the shunted material may create a current path around the layers of the magnetic read head with a resistance which is not affected by stored magnetic charge in the magnetic disk. Because the resistance of the shunt may not be affected by stored magnetic charge in the magnetic disk, as the magnetic read head passes over stored magnetic charge, the voltage across the layers in the magnetic read head may not vary as greatly as it would if the shunt were not present. Because the voltage across the layers in the magnetic read head may not vary as greatly, the resistance change in the magnetic head due to the stored magnetic charge may be more difficult to detect.

Accordingly, what is needed is a method and magnetic read head to reduce shunting in a magnetic read head.

SUMMARY OF THE INVENTION

Embodiments of the present invention generally provide a magnetic read head and a method for manufacturing a magnetic read head. In one embodiment, the method includes providing the magnetic read head comprising a pinning layer disposed over a substrate of the magnetic read head, a pinned layer disposed over the pinning layer, a reference layer disposed over the pinning layer, a tunneling barrier layer disposed over the reference layer, and a free layer disposed over the tunneling barrier layer, wherein the free layer is in contact with the tunneling barrier layer. The method further includes milling partially through the free layer from a back surface opposite an air bearing surface of the magnetic read head, thereby creating an exposed face of the free layer which is parallel to the substrate. The method further includes oxidizing a portion of the free layer between the exposed face and the tunneling barrier layer, and milling through the free layer, tunneling barrier layer, reference layer, pinned layer, and pinning layer along lateral sides of the magnetic read head. In one embodiment, the lateral sides are perpendicular with respect to the back surface and the lateral sides of the magnetic read head do not have a face of the free layer parallel to the substrate which is oxidized.

One embodiment of the invention provides a magnetic read head which includes a substrate, a pinning layer deposited over the substrate, a pinned layer deposited over the pinning layer, a reference layer deposited over the pinned layer, a tunneling barrier layer deposited over the reference layer, and a free layer deposited over the tunneling barrier layer, wherein the free layer is in contact with the tunneling barrier layer. The magnetic read head further includes a back surface opposite an air bearing surface of the magnetic read head, wherein the back surface has been milled from a top side opposite the substrate partially through the free layer, thereby creating an exposed face of the free layer which is parallel to the substrate. The magnetic read head further includes a portion of the free layer between the exposed face and the tunneling barrier layer which is oxidized and lateral sides of the read head which are perpendicular with respect to the back surface. In one embodiment, the free layer, tunneling barrier layer, reference layer, pinned layer, and pinning layer have been milled along the lateral sides of the magnetic read head and the lateral sides of the magnetic read head do not have a face of the free layer parallel to the substrate which is oxidized.

One embodiment of the invention provides a hard drive, comprising a magnetic disk, an arm rotatably mounted to move over the magnetic disk, and a magnetic read head connected to an end of the arm including a substrate, a pinning layer deposited over the substrate, a pinned layer deposited over the pinning layer, a reference layer deposited over the pinned layer, a tunneling barrier layer deposited over the reference layer, and a free layer deposited over the tunneling barrier layer, wherein the free layer is in contact with the tunneling barrier layer. The magnetic read head further includes a back surface opposite an air bearing surface of the magnetic read head. In one embodiment, the air bearing surface of the magnetic read head faces the magnetic disk and the back surface has been milled from a top side of the magnetic read head opposite the substrate partially through the free layer, thereby creating an exposed face of the free layer which is parallel to the substrate. The magnetic read head further includes a portion of the free layer between the exposed face and the tunneling barrier layer which is oxidized. The magnetic read head further includes lateral sides of the read head which are perpendicular with respect to the back surface. In one embodiment, the free layer, tunneling barrier layer, reference layer, pinned layer, and pinning layer have been milled along the lateral sides of the magnetic read head and the lateral sides of the magnetic read head do not have a face of the free layer parallel to the substrate which is oxidized.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

The present invention generally provides a magnetic read head and a method for manufacturing a magnetic read head. In one embodiment, the method includes providing the magnetic read head comprising a pinning layer disposed over a substrate of the magnetic read head, a pinned layer disposed over the pinning layer, a reference layer disposed over the pinning layer, a tunneling barrier layer disposed over the reference layer, and a free layer disposed over the tunneling barrier layer, wherein the free layer is in contact with the tunneling barrier layer. The method further includes milling partially through the free layer from a back surface opposite an air bearing surface of the magnetic read head, thereby creating an exposed face of the free layer which is parallel to the substrate and oxidizing a portion of the free layer between the exposed face and the tunneling barrier layer. The method further includes milling through the free layer, tunneling barrier layer, reference layer, pinned layer, and pinning layer along lateral sides of the magnetic read head. In one embodiment, the lateral sides are perpendicular with respect to the back surface and the lateral sides of the magnetic read head do not have a face of the free layer parallel to the substrate which is oxidized. By oxidizing the portion of the free layer which is exposed during milling, shunting of the free layer to other layers may be prevented, for example, by the oxidized portion of the free layer which insulates the free layer from other layers of the magnetic read head.

An Exemplary Hard Drive

Figure 1:
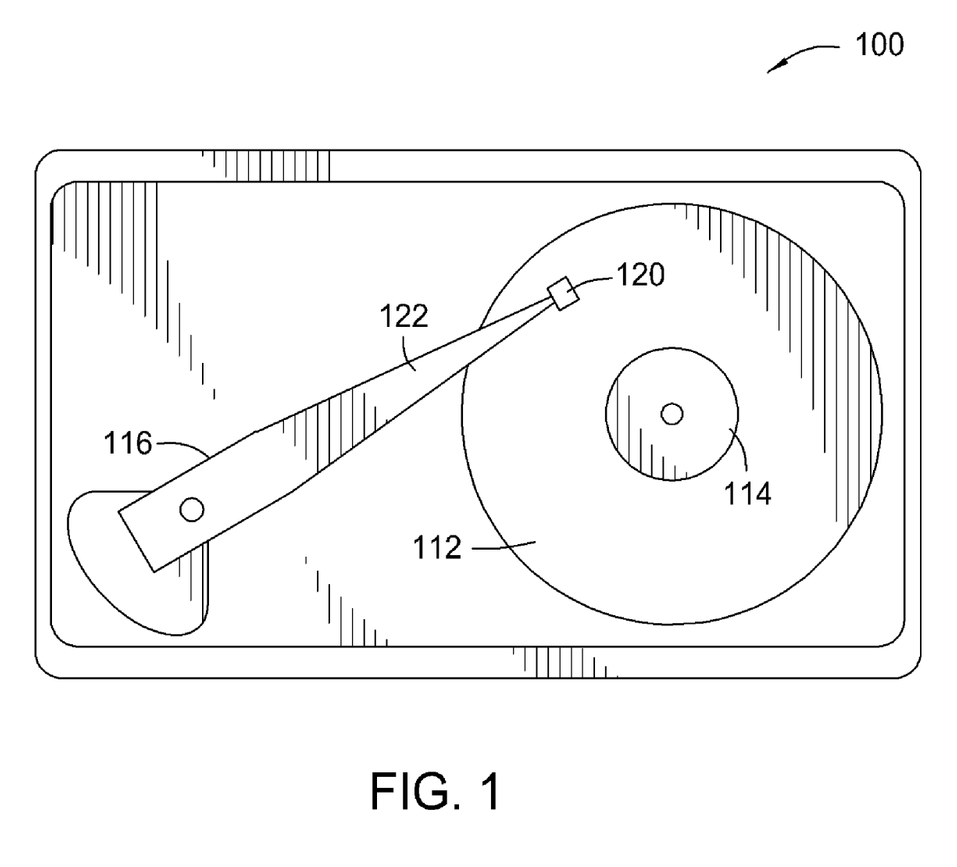
FIG. 1 is a block diagram depicting a hard drive according to one embodiment of the invention.

FIG. 1 is a block diagram depicting a hard drive 100 according to one embodiment of the invention. The hard disk drive 100 includes a magnetic media hard disk 112 mounted upon a motorized spindle 114. An actuator arm 116 is pivotally mounted within the hard disk drive 100 with a slider 120 disposed upon a distal end 122 of the actuator arm 116. During operation of the hard disk drive 100, the hard disk 112 rotates upon the spindle 114 and the slider 120 acts as an air bearing surface (ABS) adapted for flying above the surface of the disk 112. The slider 120 includes a substrate base upon which various layers and structures that form a magnetic reader are fabricated. Magnetic read heads disclosed herein can be fabricated in large quantities upon a substrate and subsequently sliced into discrete magnetic read/write heads for use in devices such as the hard disk drive 100.

Layers of an Exemplary Magnetic Read Head

Figure 2:
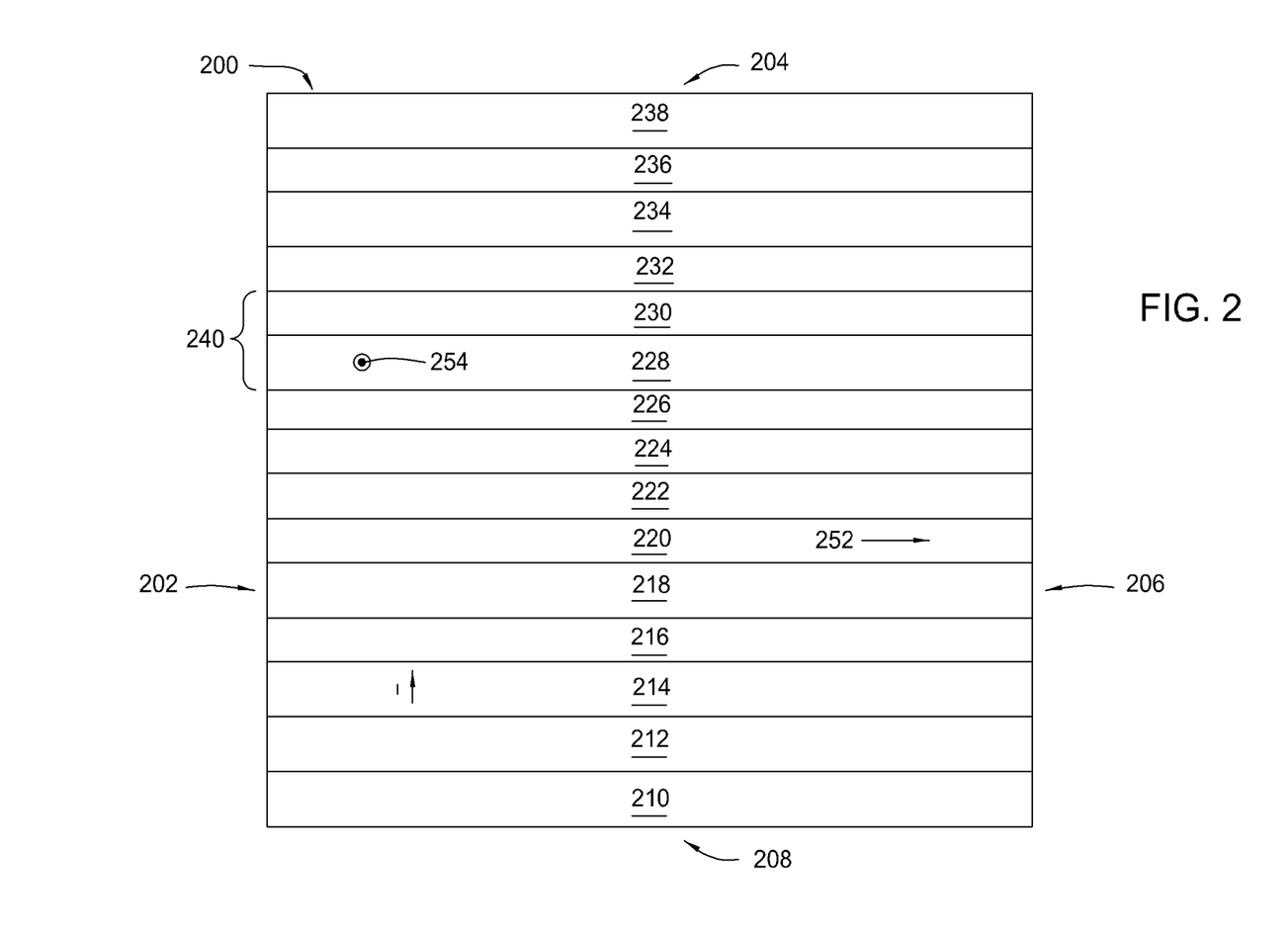
FIG. 2 is a block diagram depicting exemplary layers of a magnetic read head according to one embodiment of the invention.

FIG. 2 is a block diagram depicting exemplary layers of a read head 200 according to one embodiment of the invention. In the depicted embodiment, a tunneling magnetoresistive (TMR) read head is shown in which current I tunneling through a tunneling barrier layer 226 is affected by the alignment of a magnetic field 254 in a free layer 240 (with a magnetic field 254 which may be changed, e.g., due a magnetic charge stored on a disk 112) and a pinned layer 220 (with a magnetic field 252 which is pinned to a given alignment by an antiferromagnetic (AFM) pinning layer 218). The magnetic read head 200 may have a bottom side 208, top side 204, a side 202 which acts as an air bearing surface (ABS), and a back surface 206 opposite from the ABS side 202.

As depicted, the magnetic read head 200 may include a substrate 210 and an initial underlayer 212. A first magnetic shield layer S1 may plated on the underlayer 212 and a Tantalum (Ta) and/or Ruthenium (Ru) spacer layer may be deposited on the shield layer 214. An Iridium-Manganese-Chromium (IrMnCr) pinning layer 218 may then be deposited on the Ta/Ru spacer layer 216, followed by a Cobalt-Iron (CoFe) pinned layer 220. In one embodiment, the pinned layer 220 may be about 25 angstroms (Å) thick. The pinning layer 218 may fix the direction of a magnetization 252 of the pinned layer 220 substantially in a direction directed from right to left or from left to right.

On the pinned layer 220, another Ru spacer layer 222 may be deposited, followed by a Cobalt-Iron-Boron (CoFeB) reference layer 224. In one embodiment, the reference layer 224 may be about 20 Å thick. A Magnesium-Oxide tunneling barrier layer 226 may be deposited on the reference layer 224, followed by a free layer 240 which includes a CoFe or CoFeB first layer 228 and a second layer 230 of Nickel-Iron (NiFe) or Cobalt alloy (CoX) of Cobalt and another material such as Iron-Boron (CoFeB) or Boron (CoB). The free layer 240 may provide a magnetic moment 254 directed either out of the head or into the head 200. Other spacer layers 232, 234 may be deposited on the free layer 240 followed by a lead layer 236 and a second shield layer S2 238 which is plated on the lead layer 236. In general, the depicted layers are exemplary layers and a read head 200 may, in some cases, contain more layers or fewer layers at different thicknesses as known to those skilled in the art. Similarly, materials other than those shown may be used for given layers as known to those skilled in the art. Additional embodiments regarding the manufacture of the read head 200 are provided below with respect to FIGS. 3-9.

Method for Manufacturing the Magnetic Read Head

Figure 3:
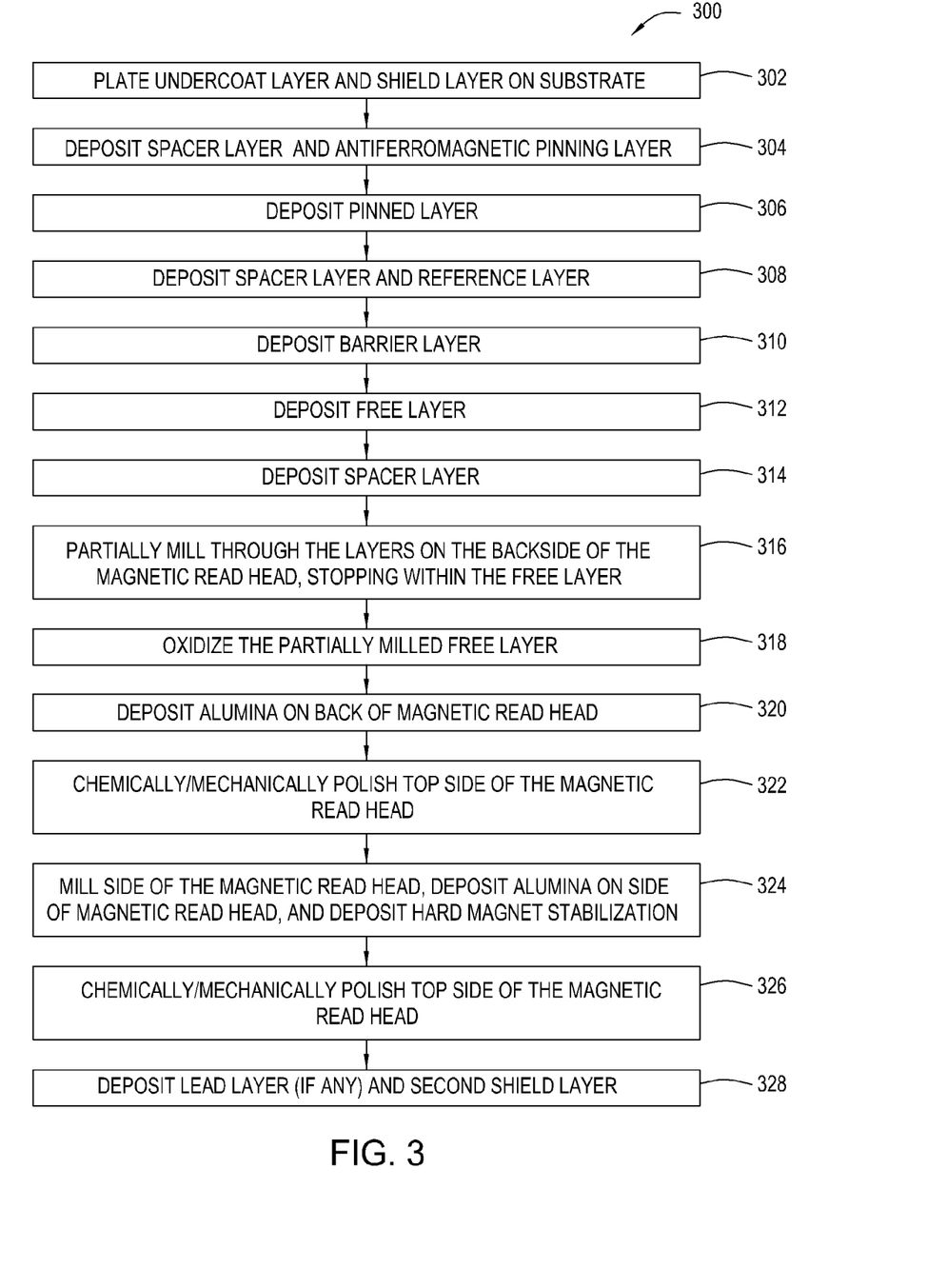
FIG. 3 is a flow diagram depicting a process for manufacturing a magnetic read head according to one embodiment of the invention.
Figure 4:
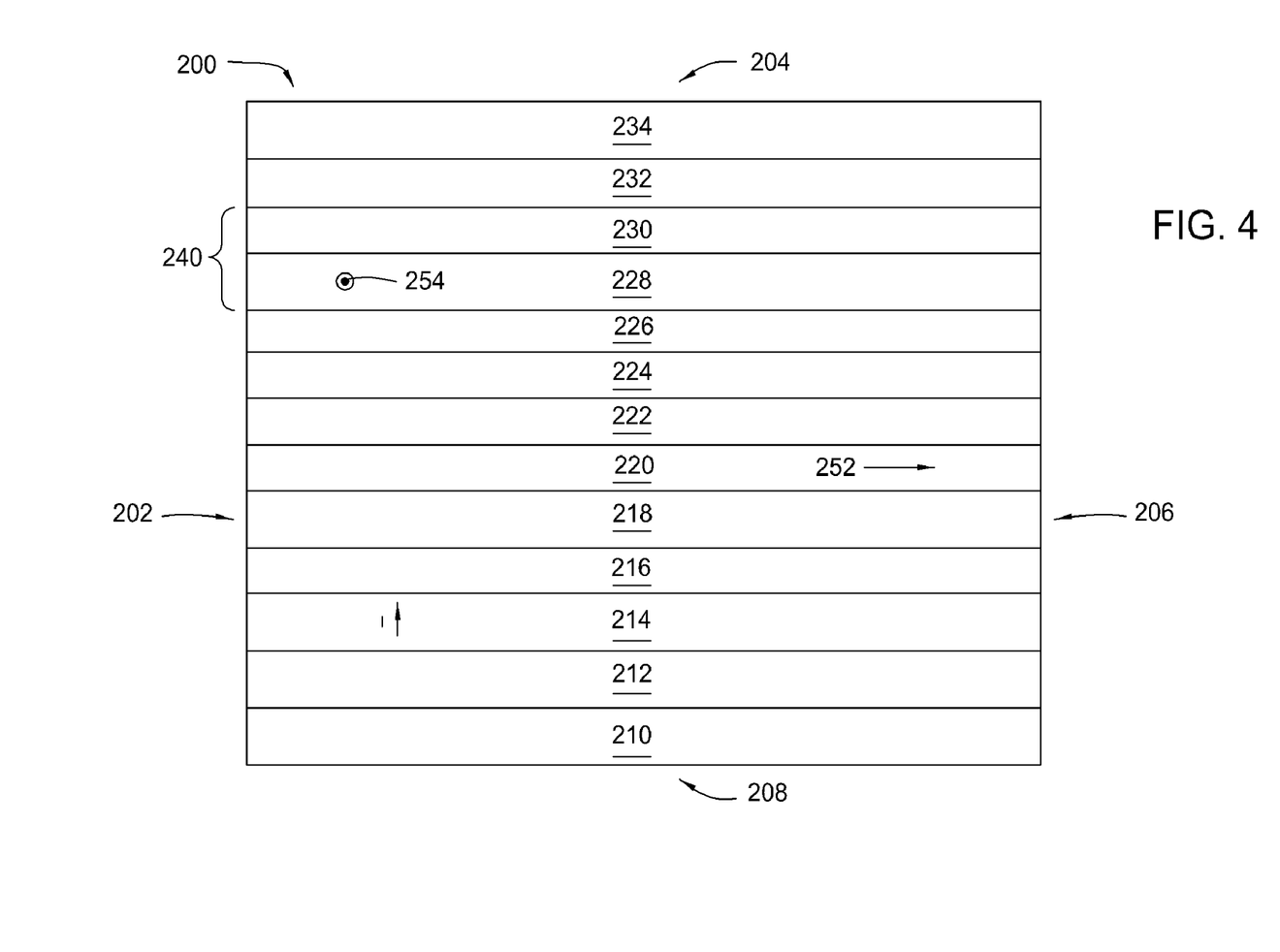
FIG. 4 is a block diagram depicting deposited layers of a magnetic read head according to one embodiment of the invention.

FIG. 3 is a block diagram depicting a process 300 for manufacturing a magnetic read head 200 according to one embodiment of the invention. As depicted, the process 302 may begin at step 302 where an undercoat layer 212 and shield layer 214 may be plated on a substrate 210. At step 304, a spacer layer 216 and AFM pinning layer 218 may be deposited. In one embodiment, the spacer layer 216 may be made from Tantalum (Ta) and/or Ruthenium (Ru), and the AFM pinning layer 218 may be made from Iridium-Manganese-Chromium (IrMnCr). Then, at step 306, a pinned layer 220 may be deposited, followed by a spacer layer 222 and a reference layer 224 which are deposited at step 308. In one embodiment, the pinned layer 220 may be made from Cobalt-Iron (CoFe), the spacer layer 222 may be made from Ruthenium (Ru), and the reference layer 224 may be made from Cobalt-Iron-Boron (CoFeB). Then, at step 310, a tunneling barrier layer 226 may be deposited. In one embodiment, the tunneling barrier layer may be made from Magnesium oxide (MgO). At step 312, a free layer 240 may be deposited, for example, including a first free layer 228 and a second free layer 230. In one embodiment, the first free layer 228 may be made from Cobalt-Iron (CoFe) or Cobalt-Iron-Boron (CoFeB), and the second free layer 230 may be made from Nickel-Iron (NiFe) or a Cobalt composite (CoX, where X=Fe or FeB). At step 314, spacer layers 232, 234 may be deposited. In one embodiment, the spacer layers 232, 234 may each be made from Tantalum (Ta) or Ruthenium (Ru). The resulting layers are depicted in FIG. 4.

Figure 5:
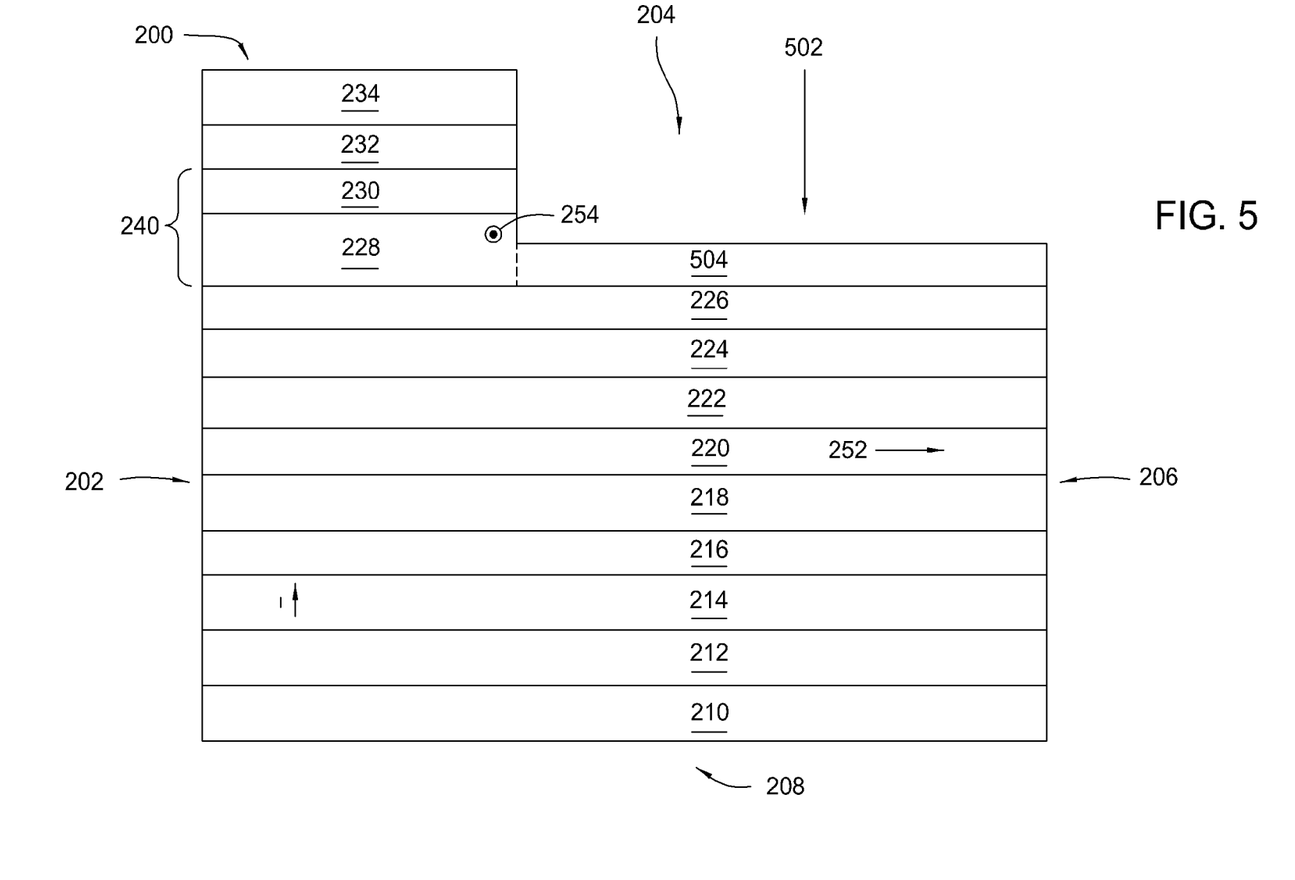
FIG. 5 is a block diagram depicting a partially milled magnetic read head according to one embodiment of the invention.

After depositing each of the layers of the magnetic read head 200, partial milling of the magnetic read head 200 may be performed along the back 206 of the magnetic read head 200 at step 316. As depicted in FIG. 5, the partial milling 502 may be performed midway into the free layer 240, thereby creating a portion 504 of the free layer on the back surface 206 of the magnetic read head 200 which has a face parallel to the substrate 210.

In one embodiment, the milling 502 may be performed in a series of steps. For example, an initial step may involve milling at a small angle (e.g., 10 degrees) which may result in a high etch rate and possibly greater redeposition of material during milling. A subsequent step may involve milling at a larger angle (e.g., 50 degrees) which may result in greater cleaning of redeposition material. In some cases, milling 502 at the small angle and subsequently at the larger angle may be repeated several times. In some cases, after milling 502, an etch cleaning step may be performed for a specified time period (e.g., 50-90 seconds), thereby allowing the milled back surface of the magnetic read head 200 to be further cleaned. Optionally, milling 502 may be performed in any other manner known to those skilled in the art.

In one embodiment, the portion 504 of the free layer 240 may be as thick as 40 or 60 Å so that the entire portion 504 may be oxidized as described below. Optionally, the portion 504 may be 15 to 20 Å thick, thereby allowing the entire portion 504 of the free layer 240 to be oxidized while providing a portion 504 which is thick enough so that variances in the milling process across a wafer do not inadvertently mill entirely through the portion 504 of the free layer 240.

Figure 6:
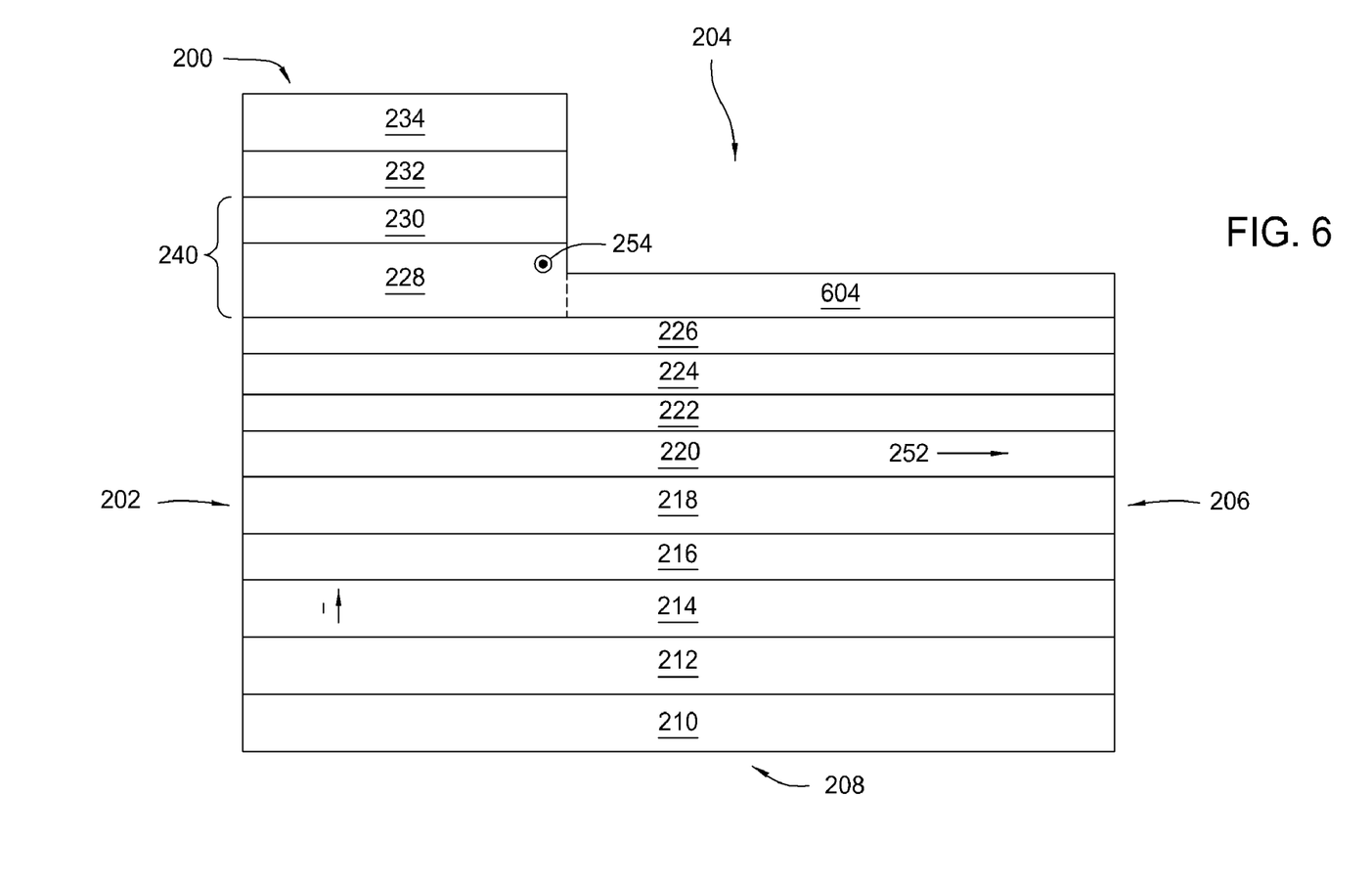
FIG. 6 is a block diagram depicting a partially milled magnetic read head with an oxidized free layer according to one embodiment of the invention.

At step 318, the portion 504 of the free layer 240 which is exposed during partial milling may be oxidized. The oxidation may be performed, for example, by exposing the portion 504 of the free layer 240 to oxygen within the chamber (natural oxidation), by plasma-assisted oxidation, or by any other oxidation process known to those skilled in the art. In one embodiment, the oxidation may be performed so that the entire exposed portion 504 of the free layer 240 is oxidized from the point where milling 502 stops to the tunneling barrier layer 226. As described above, where the portion 504 of the free layer 240 is as thick as 40 Å, the entire 40 or 60 Å of the portion 504 may be oxidized. Similarly, where the portion 504 is 15 to 20 Å thick, the entire 15 to 20 Å may be oxidized. The oxidized portion 604 of the free layer 240 is depicted in FIG. 6 according to one embodiment of the invention.

Figure 7:
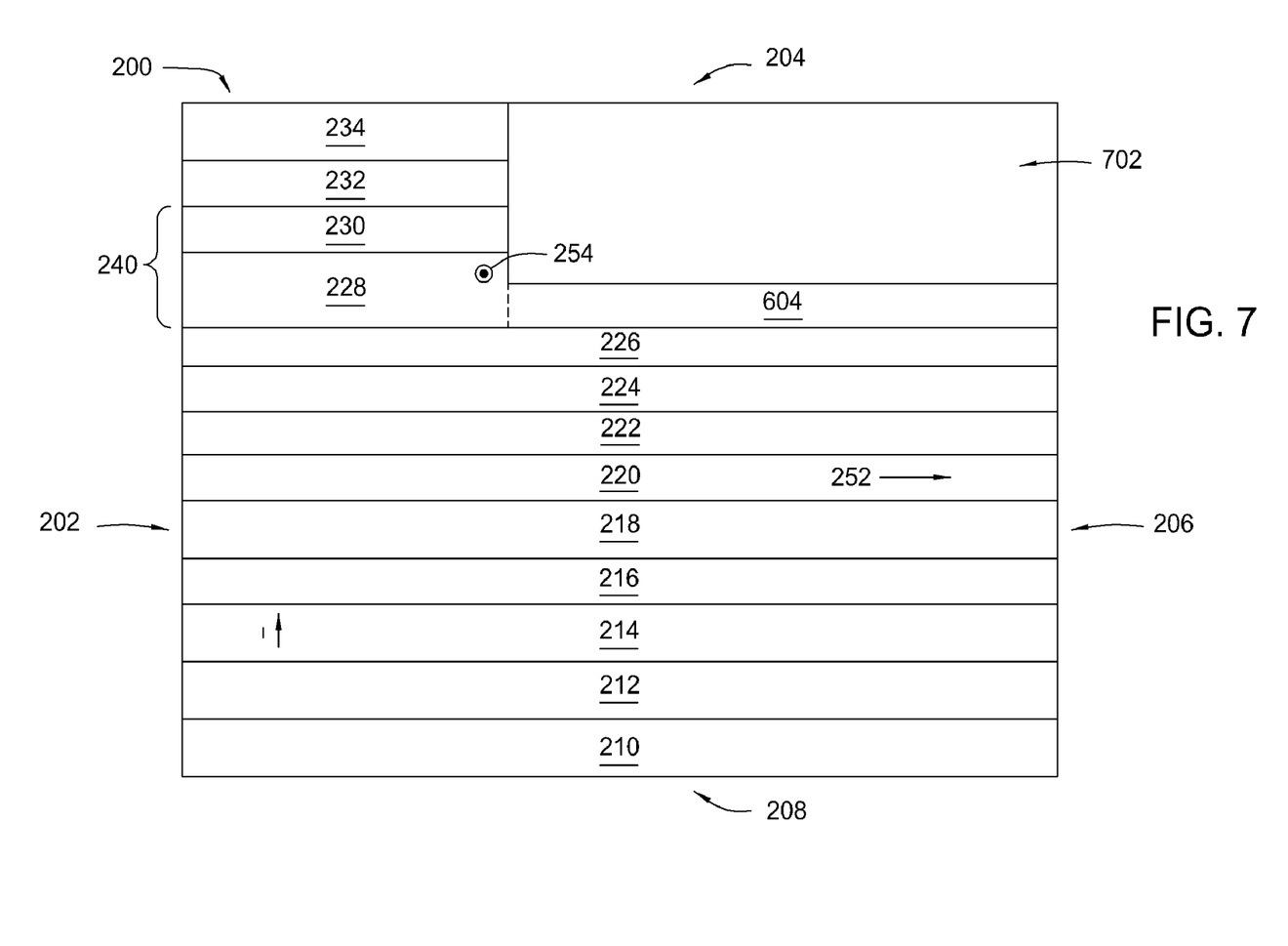
FIG. 7 is a block diagram depicting a partially milled magnetic read head with an aluminum oxide deposit according to one embodiment of the invention.
Figure 8:
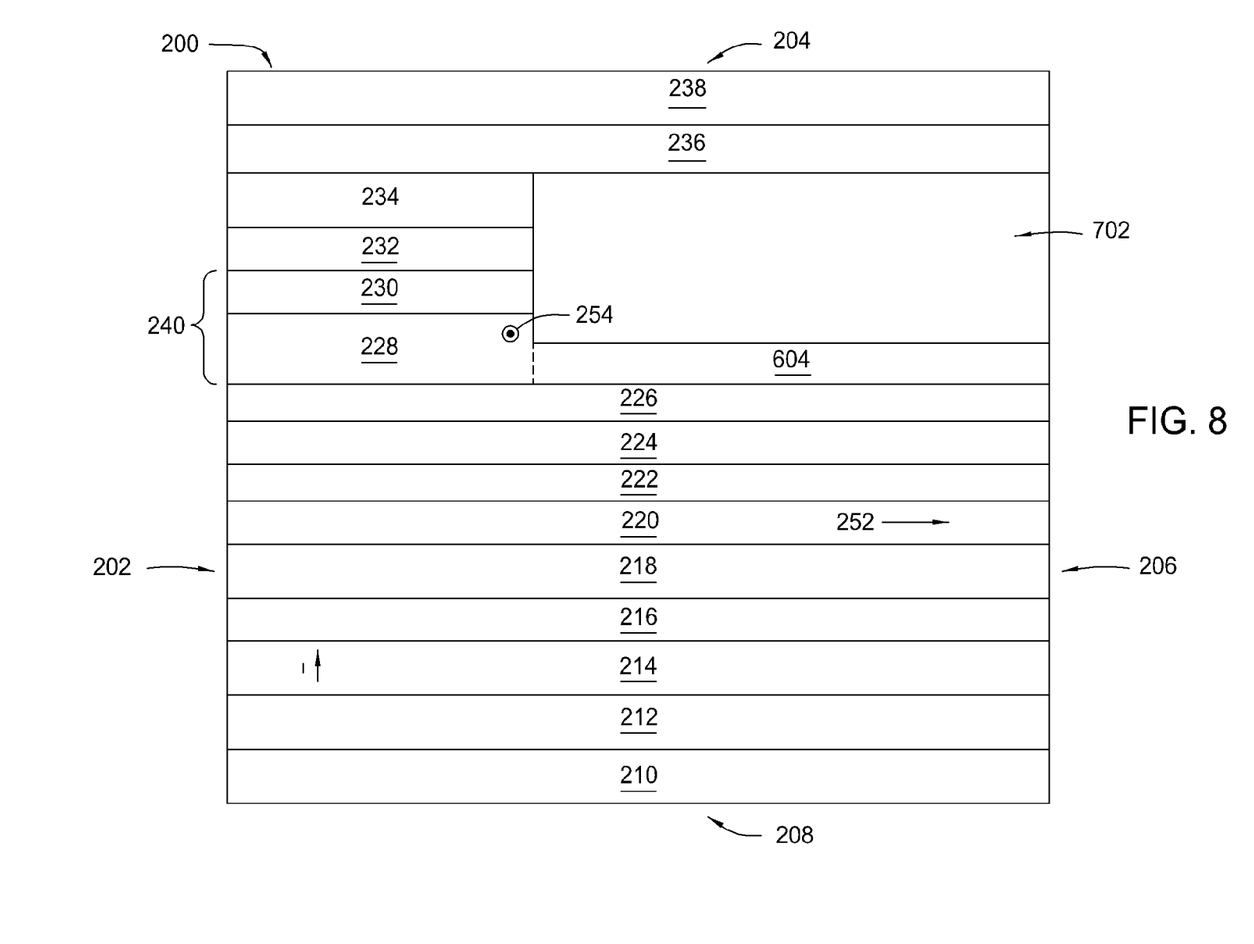
FIG. 8 is a block diagram depicting a partially milled magnetic read head with a lead layer and second shield layer deposited over other layers of the magnetic read head according to one embodiment of the invention.

At step 320, a layer 702 of alumina ($Al_2O_3$) may be deposited on the back surface 206 of the magnetic read head 200 as depicted in FIG. 7. In one embodiment of the invention, the layer 702 of alumina may be deposited by atomic layer deposition (ALD). The layer 702 of alumina may, for example, be 70 to 80 Å thick. Then, at step 322, the top side 204 of the magnetic read head 200 may be chemically/mechanically polished and at step 324 the lateral sides (e.g., those perpendicular to the ABS 202) of the magnetic read head 200 may be milled, a layer of alumina may be deposited on the lateral sides, and a hard magnet stabilization layer may be deposited on the lateral sides of the magnetic read head 200. Then, at step 326, the top side 204 of the magnetic read head 200 may be chemically/mechanically polished again, and at step 328 the lead layer 236 may be deposited and the second shield layer 238 may be plated. In some cases, the lead layer 236, which may be used to provide a desired magnetic gap of the magnetic read head 200, may be omitted where the other combined layers of the magnetic read head 200 provide a desired magnetic gap of the read head 200.

Figure 9:
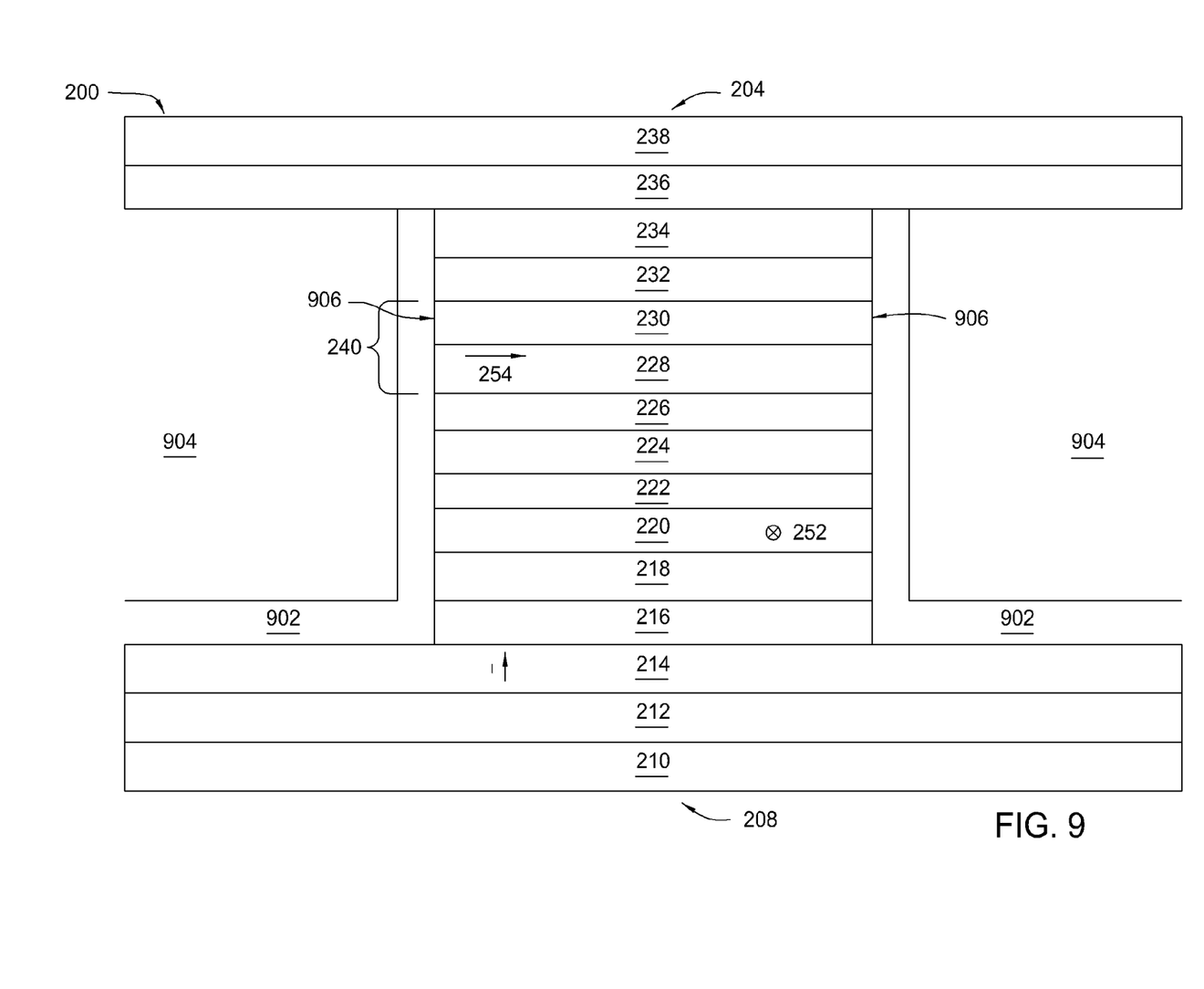
FIG. 9 is a block diagram depicting a view of the magnetic read head from the air bearing surface (ABS) according to one embodiment of the invention.

FIG. 9 is a block diagram depicting the magnetic read head 200 as viewed from the ABS side 202 according to one embodiment of the invention. FIG. 9 shows the milled lateral sides 906 (e.g., those perpendicular to the ABS 202) of the magnetic read head 200, the deposited layer 902 of alumina on the lateral sides 906, and deposited the hard magnet stabilization layer 904 on the lateral sides 906 of the magnetic read head 200.

As depicted, the milling of the lateral sides 906 may be performed through the free layer 240, tunneling barrier layer 226, the reference layer 224, the pinned layer 220, and the pinning layer 218, as well as other layers along the lateral sides 906 of the magnetic read head 200 between the first shield layer 214 and the second shield layer 238. By milling the sides of the magnetic read head 200, a narrow track width for the magnetic read head 200 may be provided, thereby improving sensitivity of the magnetic read head 200 with respect to the areal density of information stored in the magnetic disk 112. Furthermore, in some cases, such milling may not leave a portion of the free layer 240 parallel to the substrate 210 on the lateral sides 906 which is oxidized. In one embodiment, the milling of the lateral sides 906 may be performed in a series of steps beginning with a 10 degree milling step followed by a 70 degree mill. In some cases, the milling may be performed with an overmill into the first shield layer 214. The overmill may, for example, be 60 to 100 Å into the first shield layer 214. The milling of the lateral sides may be performed, in some cases, with a clean ration of 125% to 150%.

In some cases, the layers of alumina 902 may be deposited via ALD and may be from 70 to 80 Å thick. Also, in one embodiment, the hard magnet stabilization layers 904 may be cobalt-platinum (CoPt), cobalt-platinum-chromium (CoPtCr), or any other appropriate material. In some cases, the hard magnet stabilization layers 904 may be ten times the thickness of the free layer 240. For example, if the free layer is 30 to 40 Å thick, the hard magnet stabilization layer 904 may be 300 to 400 Å thick.

CONCLUSION

As described above, embodiments of the invention provide a magnetic read head which may reduce shunting and a method for manufacturing a magnetic read head which may reduce shunting. In one embodiment, the method includes providing the magnetic read head comprising a pinning layer disposed over a substrate of the magnetic read head, a pinned layer disposed over the pinning layer, a reference layer disposed over the pinned layer, a tunneling barrier layer disposed over the reference layer, and a free layer disposed over the tunneling barrier layer, wherein the free layer is in contact with the tunneling barrier layer. The method further includes milling partially through the free layer from a back surface opposite an air bearing surface of the magnetic read head, thereby creating an exposed face of the free layer which is parallel to the substrate, oxidizing a portion of the free layer between the exposed face and the tunneling barrier layer, and milling through the free layer, tunneling barrier layer, reference layer, pinned layer, and pinning layer along lateral sides of the magnetic read head. In one embodiment, the lateral sides are perpendicular with respect to the back surface and the lateral sides of the magnetic read head do not have a face of the free layer parallel to the substrate which is oxidized. By oxidizing the portion of the free layer which is exposed during milling, shunting of the free layer to other layers may be prevented, for example, by the oxidized portion of the free layer which insulates the free layer from other layers of the magnetic read head.

While the foregoing is directed to embodiments of the present invention, other and further embodiments of the invention may be devised without departing from the basic scope thereof, and the scope thereof is determined by the claims that follow.

What is claimed is:

1. A magnetic read head, comprising:
   a substrate;
   a pinning layer deposited over the substrate;
   a pinned layer deposited over the pinning layer;
   a reference layer deposited over the pinned layer;
   a tunneling barrier layer deposited over the reference layer;
   a free layer deposited over the tunneling barrier layer, wherein the free layer is in contact with the tunneling barrier layer;
   a back surface opposite an air bearing surface of the magnetic read head, wherein the back surface has been milled from a top side of the magnetic read head opposite the substrate partially through the free layer, thereby creating an exposed face of the free layer which is parallel to the substrate,
   wherein a first portion of the free layer between the exposed face and the tunneling barrier layer is oxidized,
   wherein the free layer, tunneling barrier layer, reference layer, pinned layer, and pinning layer have been milled along lateral sides of the magnetic read head which are perpendicular with respect to the back surface, and
   wherein at least a portion of the lateral sides of the magnetic read head comprise a face of a second portion of the free layer which is not oxidized.

2. The magnetic read head of claim 1, wherein the first portion of the free layer between the exposed face and the tunneling barrier layer is less than 60 angstroms (Å) thick.

3. The magnetic read head of claim 1, wherein the first portion of the free layer between the exposed face and the tunneling barrier is less than 40 Å thick.

4. The magnetic read head of claim 1, wherein the first portion of the free layer between the exposed face and the tunneling barrier is 15 to 20 Å thick.

5. The magnetic read head of claim 1, further comprising:
   a layer of alumina plated directly on the free layer, the barrier layer, the reference layer, the pinned layer, and the pinning layer along the lateral sides of the magnetic read head.

6. The magnetic read head of claim 1, wherein the magnetic read head further comprises a shield layer which is plated between the substrate and the pinning layer and wherein the lateral sides of the magnetic read head have been milled to a depth of 60 to 100 Å into the shield layer.

7. The magnetic read head of claim 1, wherein the free layer comprises at least one of cobalt-iron (CoFe), cobalt-iron-boron (CoFeB), nickel-iron (NiFe), and cobalt-boron (CoB).

8. The magnetic read head of claim 1, wherein the tunneling barrier layer comprises magnesium-oxide (MgO).

9. A hard drive, comprising:
   a magnetic disk;
   an arm rotatably mounted to move over the magnetic disk; and
   a magnetic read head connected to an end of the arm comprising:
      a substrate;
      a pinning layer deposited over the substrate;
      a pinned layer deposited over the pinning layer;
      a reference layer deposited over the pinned layer;
      a tunneling barrier layer deposited over the reference layer;
      a free layer deposited over the tunneling barrier layer, wherein the free layer is in contact with the tunneling barrier layer;
      a back surface opposite an air bearing surface of the magnetic read head, wherein the air bearing surface of the magnetic read head faces the magnetic disk, wherein the back surface has been milled from a top side of the magnetic read head opposite the substrate partially through the free layer, thereby creating an exposed face of the free layer which is parallel to the substrate,
      wherein a first portion of the free layer between the exposed face and the tunneling barrier layer which is oxidized,
      wherein the free layer, tunneling barrier layer, reference layer, pinned layer, and pinning layer have been milled along lateral sides of the magnetic read head which are perpendicular with respect to the back surface, and
      wherein at least a portion of the lateral sides of the magnetic read head comprise a face of a second portion of the free layer which is not oxidized.

10. The hard drive of claim 9, wherein the first portion of the free layer between the exposed face and the tunneling barrier is 15 to 20 Å thick.

11. The hard drive of claim 9, further comprising:
   a layer of alumina plated directly on the free layer, the barrier layer, the reference layer, the pinned layer, and the pinning layer along the lateral sides of the magnetic read head.

12. The hard drive of claim 9, wherein the free layer comprises at least one of cobalt-iron (CoFe), cobalt-iron-boron (CoFeB), nickel-iron (NiFe), and cobalt-boron (CoB).

* * * * *

UNITED STATES PATENT AND TRADEMARK OFFICE
CERTIFICATE OF CORRECTION

Page 1 of 1

PATENT NO. : 7,746,602 B2
APPLICATION NO. : 11/425665
DATED : June 29, 2010
INVENTOR(S) : Hardayal S. Gill It is certified that error appears in the above-identified patent and that said Letters Patent is hereby corrected as shown below:

In the Claims:

In Claim 9, at column 8, Line 45, please delete "which".

Signed and Sealed this
Twentieth Day of March, 2012

David J. Kappos
*Director of the United States Patent and Trademark Office*